Figure 1:
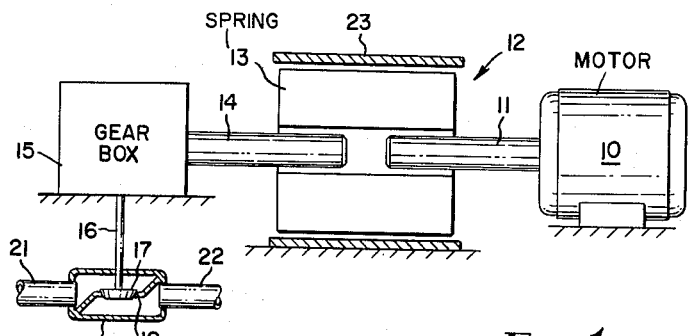

April 10, 1962  G. F. JENKINS ETAL  3,028,726
SPRING RETURN LOAD CONTROL DEVICE
Filed Dec. 23, 1959

INVENTORS
GEORGE F. JENKINS
ROMAN SMULKA
BY
*Alfred M. Feldman*
ATTORNEY

United States Patent Office 3,028,726
Patented Apr. 10, 1962

3,028,726
SPRING RETURN LOAD CONTROL DEVICE
George F. Jenkins, Bloomington, and Roman Smulka, Minneapolis, Minn., assignors to Minneapolis-Honeywell Regulator Company, Minneapolis, Minn., a corporation of Delaware
Filed Dec. 23, 1959, Ser. No. 861,478
7 Claims. (Cl. 60—7)

The present invention is directed to a type of load control or load coupling device. The novel device allows a substantial reduction in power of a driving means or motor, while being capable of handling the same ultimate work load.

It has become common in many fields such as the commercial, industrial and residential heating and ventilating fields to utilize an electric motor which drives a valve or damper from an open to a closed position depending on a particular need. It has further become quite common to utilize a motor that has a spring attached to the shaft of the motor and which is wound by the operation of the motor along with its movement of the valve or damper. The wound spring is used in case of power failure for returning the damper or valve to a fixed position that is normally considered a safe position. It is also common to utilize the spring return feature to operate the valve or damper to one of its positions thereby eliminating the need of a reversible motor and its appropriate control system.

In the prior art it has been common to operate both the motor and its associated load while carrying the spring connected between the shaft of the motor and the frame of the motor. This entails supplying a motor that has sufficient power to carry both the load of winding the spring and of operating its useful load. It becomes apparent that if some way were found to remove the need for the spring being wound with each operation of the motor, that the size of the motor could be substantially reduced. The present invention is directed to an arrangement that overcomes the need of having a large motor which is capable of winding a spring and operating a load simultaneously.

The need of an electric motor to carry a spring has also created problems in the field of modulated motor operation because the spring tends to aid the motor's operation in one direction while opposing it in the opposite direction. In modulating control systems utilizing an electric motor it would be desirable if the load in both directions were uniform thereby easing the control problems. In such systems, however, it still remains essential that a safety provision be maintained in case of power failure. This safety feature is the winding of the spring, thereby having a source of energy available upon loss of electrical energy to the motor. The spring energy is applied to rotate the motor and its driven load to what is normally referred to as the "safe position." It is understood that the terminology "safe position" is used for convenience. The term "safe position" can mean any fixed position to which a spring return motor can be conveniently rotated whenever there is a deenergization of the motor due to power failure or to an intentional discontinuance of power to the motor.

In order to overcome these problems, the present invention is directed to the primary object of providing a load coupling device capable of returning a load to a safe position upon power failure.

Another object of the present invention is to provide a spring return type of load coupling device that requires a driving motor large enough to power the load or winding the return spring, but not both.

Still a further object of the present invention is to provide a spring return type of load coupling that releases the motor from the return spring during modulating action thereby eliminating the tendency of the spring to drive the motor during a modulating operation.

Yet another object of this invention is to provide a simplified arrangement that can be coupled between a motor and its useful load without being permanently attached to the motor load thereby providing a spring return arrangement that can be added as an accessory, if the need should arise.

Figure 2:
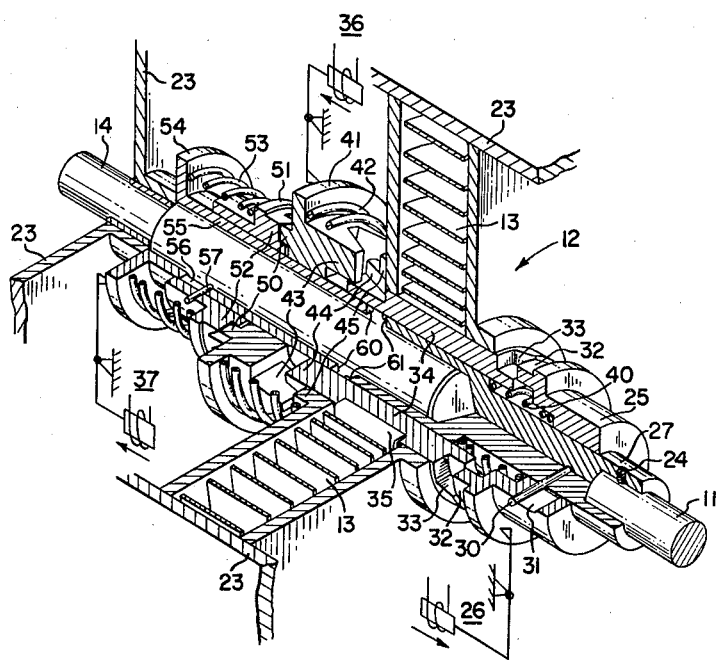

These and other objects will become apparent when the single sheet of drawings is considered in light of the present detailed specification. In the single sheet of drawings FIGURE 1 is a schematic representation of the load control device, disclosing the invention for purposes of explanation of the broad principles. FIGURE 2 is an isometric and partial cross-section of one embodiment of the invention, and is disclosed in detail.

In order to explain the operation of the detailed structure disclosed in FIGURE 2, a schematic representation has been presented in FIGURE 1. This representation also will help explain the way in which the present invention distinguishes from the prior art.

In FIGURE 1 there is disclosed a motor 10 having an output shaft 11. The motor 10 can be either a unidirectional motor which is returned by a load coupling or control means 12 including a spring means 13, or can be of a bidirectional type used in a modulating motor control. The shaft 11 of motor 10 is coupled by the load coupling means 12 and the spring 13 to an output shaft 14 which drives into a gear box generally disclosed at 15. The gear box in turn operates a valve stem 16 to operate a valve 17 from a valve seat 18. The valve 17 and valve seat 18 are associated with the valve body 20 to control fluid flowing into conduit 21 and out of conduit 22.

In the prior art it was common to have an arrangement generally of the type disclosed in FIGURE 1 wherein motor 10 operated the shaft 11 which in turn wound the spring 13 while simultaneously driving the shaft 14 to open the valve 17 from the valve seat 18. This allowed fluid to flow from conduit 21 to conduit 22. Upon the desire to close the valve 17 against the valve seat 18 it was only necessary to remove the energizing power from the motor 10 thereby allowing the spring to rotate the shaft 14 and close the valve 17 against the valve seat 18. At the same time, the prior art devices cause the shaft 11 to rotate in a reverse direction. This was possible since there was no power applied to the motor 10. The arrangement thus described also provided for power failure protection which will automatically close the valve 17 on valve seat 18 whenever the power failed to the system. It becomes apparent that the motor 10 in this arrangement must have enough power to both wind the spring 13 and operate the gear box 15, while opening the valve 17 from the valve seat 18. This requires a motor approximately twice as big as a motor would be if it had only to drive the useful load, that is the gear box 15 and the valve 17.

In the present invention, the operation of FIGURE 1 is somewhat different than has been described above as is done in the prior art. The motor 10 is energized in a conventional fashion thereby driving shaft 11. The shaft 11, however, drives only part of the load coupling means 12. More specifically, the shaft 11 is clutched to the spring 13 thereby winding the spring 13. At this same time the spring 13 is not connected to shaft 14 but is declutched from the shaft, as will be seen in detail in connection with FIGURE 2. Upon completion of the winding of the spring 13 by the shaft 11, a latch is energized which locks the spring 13 to the frame 23 of the load control or coupling means 12. As soon as the spring 13 is latched to the frame 23 an electrical energizing means uncouples the shaft 11 from the spring 13 and couples the shaft 11 to shaft 14, thereby bypassing the wound and latched spring 13. The motor 10 then drives from shaft 11 to shaft 14 directly without the need of carrying the spring 13 of the load coupling means 12. The motor 10 can operate in a unidirectional fashion or can be of a modulating type and would be completely free of any load except the useful load of the gear box 15 and the valve 17.

If it is desired to close the valve 17 against the valve seat 18 in a unidirectional type motor, it is merely necessary to remove the power from the over-all unit thereby unlatching the spring 13 from the frame 23 while also causing a latch to connect the spring 13 to the shaft 14. With this arrangement the spring 13 would unwind driving the shaft 14 and its useful load, the gear box 15 and the valve 17. With this arrangement the motor 10 and shaft 11 would be left disengaged and would remain stationary. It thus becomes apparent that an arrangement has been disclosed wherein a motor is first energized to wind a safety or return spring 13. The spring 13 is then latched to the frame 23 by means of an electrical latch and the shafts of the motor and the gear box 15 are then coupled for normal operation of the unit. Upon power failure the spring 13, which had been previously wound and latched, is used as a stored energy source to rotate the shaft 14 to cause the valve 17 to move to its closed or safe position.

The arrangement disclosed in FIGURE 1 has been illustrative only of the principle involved and no effort has been made to specifically show the clutching or latching arrangement of the specific embodiment disclosed in FIGURE 2. The specific embodiment disclosing the various latches and clutch means will now be described in detail in connection with FIGURE 2. The reference numerals utilized in FIGURE 1 will, as far as is practical, be referenced into FIGURE 2 to show the comparative location of the parts of FIGURES 1 and 2.

In FIGURE 2 the load control or coupling means is generally shown in a cut-away isometric view at 12. The motor shaft 11 is partially shown having a screw 24 coupling one part of a clutch 25 that is electromagnetically operated by a clutch means generally shown at 26. The clutch means 26 operates against the part of the clutch 25 to slide this clutch member on a center shaft member 27 that is locked by the screw 24 to shaft 11. A pin 30 passes into the shaft 27 and limits the sliding motion of the member 27 by the groove 31. The clutch member 25 has a plurality of teeth 32 which are designed to engage teeth 33 of the second part 34 of the electromagnetic clutch 26. The teeth 32 and 33 engage whenever the clutch means 26 is energized thereby sliding the member 25 into the member 34. The member 34 is designed to be rotated after the teeth 32 engage teeth 33 thereby winding the spring 13. This is accomplished by the bent over portion 35 of the spring 13 wherein the bent over portion 35 rides in a groove (not shown) in the member 34.

As the shaft 11 rotates with the clutch means 26 energized, the rotation winds the spring 13. It is understood that the winding action in the present case takes place in less than 360 degrees of rotation of the member 34. This is accomplished by having a motor 10 driving shaft 11 at a slow speed or through a reduction gear box (not shown). Upon the spring 13 becoming fully wound a switch (not shown) is actuated which in turn energizes electromagnetic clutch means 36 and 37 in sequence. The use of this energization will be understood in the following explanation. The energization of the switch (not shown) also causes the deenergization of the electromagnetic clutch means 26 thereby allowing a spring 40 to separate the teeth 32 from 33 thereby disengaging the winding connection between the shaft 11 and the spring 13.

After the clutch 36 has been energized, a force is applied to the rotational toothed member 41 to slide it towards the spring 13 against a spring 42. It will be noted that the member 41 has a plurality of teeth 43 which overlap teeth 44 associated with the member 34. The overlap of the teeth 43 and 44 keeps the rotating members in alignment with one another and the member 41 is therefore rotated initially with the rotation of the member 34.

The frame 23 has a group of projections 45, only one of which is fully shown, that act as a locking means between the frame 23 and the tooth 43. Upon the spring 13 being fully wound and the clutches 36 and 37 being energized, the member 41 is rotated so that the teeth 43 are aligned with the projections 45. Upon the member 41 sliding towards the spring 13, the teeth 43 lock the member 41 into engagement with the frame 23. Since the rotating member 34 has a tooth 44 that is coupled to tooth 43 of the rotating member 41, the spring winding member 34 is also locked to the frame 23 by the movement of the member 41 under the force of the electromagnetic clutch 36. This locks the spring 13 in a wound condition as long as power is supplied to the electromagnetic clutch means 36.

The rotating member 41 has an additional set of teeth 50, which project to the left from the main portion of the rotating member 41. These teeth are sloped in arrangement and form a ratchet type clutch engagement with member 51. The member 51 has teeth 52 that project and engage with the teeth 50 so that the two members 41 and 51 can rotate relative to one another if the member 41 is turned clockwise, but the teeth 50 and 52 lock the members 41 and 51 together upon a counterclockwise revolution of member 41. This is a conventional ratchet clutch type of arrangement allowing free movement in one direction and a positive drive in the other rotational direction.

The rotating member 41 is spring loaded by spring 42 to engage against the rotational member 51 on power failure. The spring 53 is held in place by rotating member 51 and by a flange 54 on a tubular member 55. Upon energization of the electromagnetic clutch means 37 a force is applied to the flange 54 to force the tubular member 55 to the right. A slot 56 allows the movement with and along pin 57 thereby allowing the tubular member 55 to move to the right. The tubular member 55 is driven by pin 57 with the shaft 14 thereby rotating at any time shaft 14 rotates. The sliding movement of the sleeve 55 to the right causes the end 60 of the tubular member 55 to engage the end 61 of the center shaft member 27. The ends 60 and 61 in effect form a positively locking clutch arrangement to connect the tubular member 55 to the center shaft member 27. This in turn couples the shaft 11 to shaft 14 thereby supplying a direct drive from the motor 10, through the shaft 11, to the shaft 14 which in turn can be used in a manner previously described. In order to simplify the discussion, various bearings and support structures have not been specifically described and would be of any convenient type desired, as is well known in the art.

In order to more clearly understand the previously described structure, a brief description of the operation will be outlined in sequence of normal operation. The shaft 11 is rotated thereby driving the center shaft member 27 through the screw 24. Upon application of power to the motor the clutch means 26 is energized thereby sliding the clutch 25 to the left engaging teeth 32 and 33. The engagement of teeth 32 and 33 connects the motor and shaft 11 to the winding mechanism for spring 13. The spring 13 is wound, thereby tripping an electric switch (not shown) that sequentially energizes the clutch means 36 and 37 and drops the clutch means 26. The energization of clutch means 36 causes the rotating member 41 to slide to the right locking the spring 13 by sliding the teeth 43 into engagement with teeth 44 and the projection 45 on the frame 23. The clutch means 37 moves the flange 54 to the right thereby sliding the tubular member 55 into engagement with the center shaft member 27 by means of teeth 60 and 61. The sliding engagement is coupled to the shaft 14 by means of the pin 57 in slot 56. This directly couples the shaft 14 to the shaft 11 and causes the rotation of shaft 14 with the shaft 11 completely free of the wound and latched spring 13.

Upon power failure to the unit it becomes apparent that the clutch means 36 and 37 become deenergized and return to the position as shown in FIGURE 2. The spring 42 unlocks the spring 13 and allows the spring 13 to unwind driving the rotational member 34 having teeth 44 which engage teeth 43 to drive the member 41. The rotation of member 41 locks, by means of teeth 50 and 52, to the rotational member 51 which in turn drives the shaft 14 through the pin 57 which in turn is connected through the rotational member 51. This rotation is completely free of the motor as the power failure has caused the teeth 32 and 33 to disengage under the influence of spring 40, and teeth 60 and 61 under the influence of spring 53.

It becomes apparent that an arrangement has been provided wherein the motor involved first drives the shaft 11 to wind the spring 13 whereupon the spring 13 is latched. The arrangement then switches the driving force from shaft 13 through to the output shaft 14 completely free of the spring 13. Upon the occurrence of a power failure or intentional shutdown the clutch means 37 disengages the motor from the arrangement and allows the spring 13 to drive the shaft 14 thereby positioning the valve 17 in a safe or closed position.

The arrangement disclosed in the present application is one of many forms that the invention could take. It is understood that the spring 13 could be readily replaced by any resilient means that was deformed by the operation of the motor. It is further understood that the motor involved would not necessarily have to be electrical but could be of any type such as a hydraulic motor. The present invention could be carried out in a linear manner rather than in a rotational manner or could be accomplished by such means as a differential gear. For convenience in describing the operation of the unit the position to which the spring 13 drives the load has been described as a "safe position." It is obvious that this could be any selected position that it is desired to run the load to under the influence of the resilient or spring means. In addition to this all of the clutches disclosed on the device have been substantially of the locking tooth type but these clutches could be of any convenient type whether electromagnetically operated or operated under control of the energizing or power source to the unit. These and many more modifications can be made in the disclosed arrangement without varying from the scope of the invention. As such the applicants wish to be limited in the scope of the invention only by the appended claims.

We claim as our invention:

1. In a load control of the class described: motor means operating load means having various positions including a safe position; drive means including disconnect means operated by said motor means to move said load means through said various positions; said drive means including resilient means deformed by the initial operation of said motor means; power latch means to hold said resilient means in said deformed position upon said resilient means being once deformed; said drive means and said disconnect means operating said load means independent of said resilient means upon said latch means holding said resilient means; and said drive means further operating said load means to said safe position independent of said motor means upon power disruption by said resilient means being unlatched by said power latch means and said resilient means being connected to said load means by said disconnect means.

2. In a load control device of the class described: electric motor means operating rotational load means having various positions including a safe position; drive means including disconnect means operated by said motor means to position said load means through said various positions; said drive means including spring means deformed by the initial operation of said motor means; electromagnetic latch means to hold said spring means in said deformed position upon said spring means being once deformed; said drive means and said disconnect means operating said load means independent of said spring means upon said latch holding said spring means; and said drive means further operating said load means to said safe position independent of said motor means upon power disruption to said device by said spring means being unlatched by said latch means and said spring means being connected to said load means by said disconnect means.

3. In a load control device of the class described: electric motor means operating rotational load means having various positions including a safe position; drive means including clutch means operated by said motor means to position said load means through said various positions; said drive means including a spring wound by the initial operation of said motor means; an electromagnetic latch to hold said spring in said wound position upon said spring being once wound; said drive means and said clutch means operating said load means independent of said spring upon said latch holding said spring; and said drive means and said clutch means further operating said load means to said safe position independent of said motor means upon power disruption to said device by said spring being unlatched by said latch thereby allowing said spring to drive said load means through said clutch means.

4. In a rotational load control device of the class described: an electric motor operating a rotational load having various positions including a safe position; drive means including electromagnetic clutch means operated by said motor to rotate said load through said various positions; said drive means including a spring wound by the initial operation of said motor; an electromagnetic latch to hold said spring in said wound position upon said spring being once wound; said drive means and said clutch means operating said load independent of said spring upon said latch holding said spring; and said drive means and said clutch means further operating said load to said safe position independent of said motor upon power disruption to said device by said spring being unlatched by said latch thereby allowing said spring to drive said load through said clutch means.

5. In a load control device of the class described: energizing means including control means and motor means directly driving first clutch means; a frame member including resilient means coupled to said motor means by said clutch means thereby deforming said resilient means; said control means activated by said resilient means being fully deformed; second clutch means being activated through said control means when said resilient means is fully deformed while said first clutch means is uncoupled thereby; said second clutch means coupling said resilient means to said frame member and uncoupling output means from said resilient means; and third clutch means activated with said second clutch means to connect said output means to said motor means; said resilient means being coupled to said output means by said second and third clutch means upon failure of said energizing means; said resilient means driving said output means free of said motor means.

6. In a load control device of the class described: energizing means including current control means and reversible motor means directly driving first electromagnetic clutch means; a frame member including spring means coupled to said motor means by said clutch means being energized thereby deforming said spring means; said current control means activated by said spring means being fully deformed; second electromagnetic clutch means being energized through said current control means when said spring means is fully deformed while said first electromagnetic clutch means is deenergized and uncoupled thereby; said second clutch means coupling said spring means to said frame member and uncoupling an output shaft from said spring means; and third electromagnetic clutch means energized with said second clutch means to connect said output shaft to said motor means; said spring means being coupled to said output shaft by said second and third clutch means upon failure of said energizing means; said spring means driving said output shaft free of said motor means.

7. A control system for operating a load wherein the load is returned to a singular safe position upon removal of power, including: motor means operating load means having various positions including a singular safe position; drive means including motion transmitting means operated by said motor means to move said load through said various positions; resilient means deformed by the initial operation of said motor means while the load remains stationary through operation of said motion transmitting means to store energy in said resilient means; power latch means to hold said resilient means in said deformed position upon said resilient means once being deformed; said power latch means being initiated by the resilient means upon completion of deformation of said resilient means; said drive means and said motion transmitting means operating said load means independent of any further deformation of said resilient means once said latch means operates to hold said resilient means; and said drive means further operating said load means to said singular safe position independent of said motor means upon power disruption to said system by said resilient means being automatically unlatched by said power latch means thereby releasing said stored energy; said resilient means being connected to said load means by said motion transmitting means to operate said load means to its safe position.

References Cited in the file of this patent
UNITED STATES PATENTS

| | | |
|---|---|---|
| 2,384,536 | Crumble | Sept. 11, 1945 |
| 2,430,405 | Millns | Nov. 4, 1947 |
| 2,863,281 | Haydon et al. | Dec. 9, 1958 |